US012809951B2

(12) United States Patent
Phan et al.

(10) Patent No.: US 12,809,951 B2
(45) Date of Patent: Nov. 24, 2026

(54) METHOD TO ALLOW TRACEABILITY OF USIM PROFILE TRANSFER FROM A SOURCE DEVICE TO A TARGET DEVICE, CORRESPONDING SYSTEM AND REMOTE SERVER

(71) Applicant: THALES DIS FRANCE SAS, Meudon (FR)

(72) Inventors: Ly-Thanh Phan, Le Plessis Robinson (FR); Denis Praca, Luynes (FR)

(73) Assignee: THALES DIS FRANCE SAS, Meudon (FR)

( * ) Notice: Subject to any disclaimer, the term of this patent is extended or adjusted under 35 U.S.C. 154(b) by 14 days.

(21) Appl. No.: 19/131,583

(22) PCT Filed: Nov. 28, 2023

(86) PCT No.: PCT/EP2023/083365
§ 371 (c)(1),
(2) Date: May 21, 2025

(87) PCT Pub. No.: WO2024/115484
PCT Pub. Date: Jun. 6, 2024

(65) Prior Publication Data

US 2026/0195424 A1 Jul. 9, 2026

(30) Foreign Application Priority Data

Nov. 30, 2022 (EP) .................................... 22306759

(51) Int. Cl.

| | |
|---|---|
| ***H04L 29/06*** | (2006.01) |
| ***G06F 21/16*** | (2013.01) |
| ***H04L 9/40*** | (2022.01) |

(52) U.S. Cl.
CPC .......... *G06F 21/16* (2013.01); *H04L 63/0442* (2013.01); *H04L 63/061* (2013.01);
(Continued)

(58) Field of Classification Search
None
See application file for complete search history.

(56) References Cited

U.S. PATENT DOCUMENTS

| | | | | |
|---|---|---|---|---|
| 12,082,303 B2 * | 9/2024 | Lim | ...................... | H04L 67/306 |
| 2016/0295544 A1 * | 10/2016 | Jiang | ..................... | H04W 12/35 |

(Continued)

FOREIGN PATENT DOCUMENTS

| | | |
|---|---|---|
| EP | 3698566 A1 | 8/2020 |
| EP | 3890378 A1 | 10/2021 |

OTHER PUBLICATIONS

International Search Report (PCT/ISA/210) and Written Opinion (PCT/ISA/237) mailed on Jan. 17, 2024, by the European Patent Office as the International Searching Authority for current International Application No. PCT/EP2023/083365—[16 pages].

*Primary Examiner* — Shin-Hon (Eric) Chen

(57) ABSTRACT

Provided is a method for traceability of USIM profile transfer from a source device to a target device, that comprises performing a mutual trust verification of the target device, generating a derivation data at the source device that is verifiable by a remote server connected to the home network of the source device, deriving a new long-term-key K' from the source long term-key K and the derivation data, generating a new USIM profile including the derived long-term-key K' and the derivation data, protecting in confidentiality and integrity the new profile based on the target device public key to obtain an installation package, transferring the installation package to the target device, and deactivating the source USIM profile at the source device if the installation of the installation package at the target device is successful. Additional steps can be included along with other embodiments.

10 Claims, 2 Drawing Sheets

Figure 1:
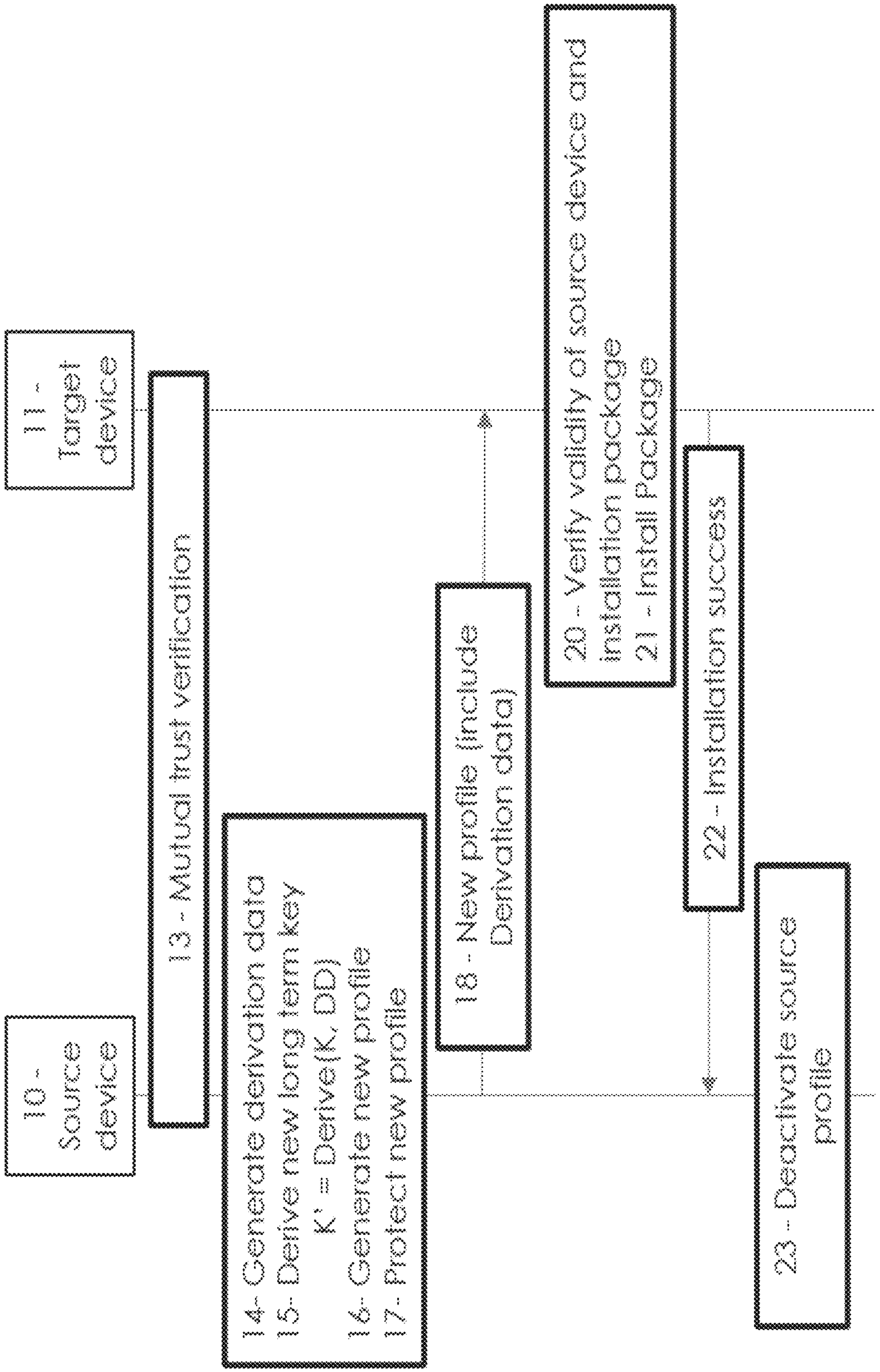

(52) U.S. Cl.
CPC ...... *H04L 63/0823* (2013.01); *H04L 63/0869* (2013.01); *H04L 63/0876* (2013.01); *H04L 63/123* (2013.01)

(56) References Cited

U.S. PATENT DOCUMENTS

| | | | | |
|---|---|---|---|---|
| 2020/0137566 | A1* | 4/2020 | Jin | H04W 12/43 |
| 2023/0209340 | A1* | 6/2023 | Kang | H04W 8/20 |
| 2023/0403563 | A1* | 12/2023 | Lee | H04W 12/04 |
| 2025/0119727 | A1* | 4/2025 | Nimbavikar | H04W 4/24 |

* cited by examiner

METHOD TO ALLOW TRACEABILITY OF USIM PROFILE TRANSFER FROM A SOURCE DEVICE TO A TARGET DEVICE, CORRESPONDING SYSTEM AND REMOTE SERVER

The invention concerns product and services in telecommunications. In particular the invention concerns a method for providing traceability of USIM profiles engaged in a device to device transfer of said profiles.

More precisely, the invention concerns a method and a system allowing traceability of USIM profile transfer from a source device to a target device, in 5G networks and future telecommunication networks.

The device is typically a smartphone, a PDA, a mobile terminal, a PC cooperating with a secure element not removable from a terminal, like a eUICC (embedded UICC) or a iUICC (integrated UICC).

The background of the invention is that the GSMA is working on mechanisms for simplifying the transfer of USIM Profile from one device to another (from a source device to a target device). Such mechanisms may be done today without the intervention of a remote server connected to the network of a home MNO (Mobile Network Operator) in proprietary manner.

The problem, unsolved so far, is to trace the transferred profiles by the home MNO.

In this respect, the present invention proposes a solution allowing a home MNO not involved during the transfer of USIM profiles between source devices and target devices to trace the transfer of these USIMs profiles and to prevent duplication of profiles containing the same long term key K.

This proposed solution consists in a method to allow traceability of USIM profile transfer from a source device to a target device, the method comprising:

- Performing a mutual trust verification of the target device by the source device and vice versa;
- Generating a derivation data at the source device, the derivation data being verifiable by a remote server connected to the home network of the source device;
- Deriving at the source device a new long-term-key K' from the source long term-key K of the source device and the derivation data;
- Generating at the source device a new USIM profile including the derived long-term-key K' and the derivation data;
- Protecting in confidentiality and integrity the new profile based on the target device's public key in order to obtain an installation package;
- Transferring the installation package to the target device;
- Deactivating the source USIM profile at the source device if the installation of the installation package at the target device is successful;
- Sending from the target device to the remote server in a registration request as specified in 3GPP TS 23.501 at least its IMSI and the derivation data;
- Retrieving at the remote server the source long term-key K of the source device and the derivation data associated to the IMSI;
- Verifying the validity of the received derivation data based on subscription information associated to the IMSI by the remote server;
- Deriving a new long term-key K* from the source long-term key K and the received derivation data;
- Performing the authentication of the target device based on K* and retrieved subscription data associated to the IMSI as specified in 3GPP TS 33.501;
- If K* equals K', updating at the home network its local subscriber information associated to the IMSI including the long-term-key associated to the IMSI with the new value of K*.

The 3GPP TS 23.501 specification is for example Release 15 dated Dec. 22 2017.

Preferably, the trust verification of the target device by the source device consists in verifying at the source device if the certificate of the target device is valid.

Advantageously, the derivation data is one or more of:

- a transfer counter decremented by one,
- a random number,
- a cryptographic token provisioned in the source device by the home network,
- the current authentication sequence number,
- the identity of the source device, e.g. its eUICCID or IMEI,
- the identity of the target device, e.g. its eUICCID or IMEI.

Preferably, the step of deriving at the source device a new long-term-key K' from the source long term-key K consists in computing a hash of the long term-key K with the derivation data.

Advantageously, the installation package includes:

- the derivation data and one or more of:
- the hash of the originally received USIM profile by the source device, or
- the certificate or fingerprint of the certificate of the originally received USIM profile by the source device.

Preferably, the target device, upon reception of the installation package from the source device:

- Verifies that the installation package is valid and comes from a valid source device;
- Installs the installation package;
- Stores locally the derivation data.

Preferably, the step of sending from the target device to the home network of the source device at least its IMSI and the derivation data consists in using a specific Routing ID of the remote server capable of handling such transferred USIM profile, in a registration request as specified in 3GPP TS 23.501.

Preferably, the remote server verifies:

- if the derivation data is the sequence number of the source device, that the received sequence number is valid relative to the locally stored sequence number by the home network;
- if the derivation data is a transfer counter, that the transfer counter is valid relative to the locally stored transfer counter by the home network,
- if the derivation data is a cryptographic token, that the cryptographic token has been derived from or is a cryptographic token associated to the IMSI,
- if the derivation data is the source device identity, that the source identity is equal to the source device identity associated to the IMSI.

The remote server updates advantageously the binding information in the HPLMN SM-DP+ between the USIM profile and the secure element of the target device, by providing the SM-DP+ with at least the IMSI, the new long term-key K*, source EUID and destination EUID.

The invention also concerns a system for allowing traceability of USIM profile transfer from a source device to a target device, the system comprising a remote server, the source device being configured for:

- Performing a mutual trust verification of the target device by the source device;

Generating a derivation data being verifiable by the remote server connected to the home network of the source device;

Deriving a new long-term-key K' from the source long term-key K of the source device and the derivation data;

Generating a new USIM profile including the derived long-term-key K' and the derivation data;

Protecting in confidentiality and integrity the new profile based on the target device's public key in order to obtain an installation package;

Transferring the installation package to the target device,

Deactivating the source USIM profile if the installation of the installation package at the target device is successful, the target device being configured for:

Sending to the remote server in a registration request as specified in 3GPP TS 23.501 at least its IMSI and the derivation data, the remote server being configured for:

Retrieving the source long term-key K of the source device and the derivation data associated to the IMSI;

Verifying the validity of the received derivation data based on subscription information associated to the IMSI;

Deriving a new long term-key K* from the source long-term key K and the received derivation data;

Performing the authentication of the target device based on K* and retrieved subscription data associated to the IMSI as specified in 3GPP TS 33.501;

If K* equals K', updating at the home network its local subscriber information associated to the IMSI including the long-term-key associated to the IMSI with the new value of K*.

The invention also concerns a remote server allowing traceability of a USIM profile transfer from a source device to a target device, the remote server being connected to the home network of the source device and configured for:

Receiving from the target device in a registration request as specified in 3GPP TS 23.501 at least its IMSI, a derivation data and a new long-term-key K' generated by the source device from the long-term-key K of the source device by the derivation data;

Retrieving the source long term-key K of the source device and the derivation data associated to the IMSI;

Verifying the validity of the received derivation data based on subscription information associated to the IMSI;

Deriving a new long term-key K* from the source long-term key K and the received derivation data;

Performing the authentication of the target device based on K* and retrieved subscription data associated to the IMSI as specified in 3GPP TS 33.501;

If K* equals K', updating at the home network its local subscriber information associated to the IMSI including the long-term-key associated to the IMSI with the new value of K*.

Figure 2:
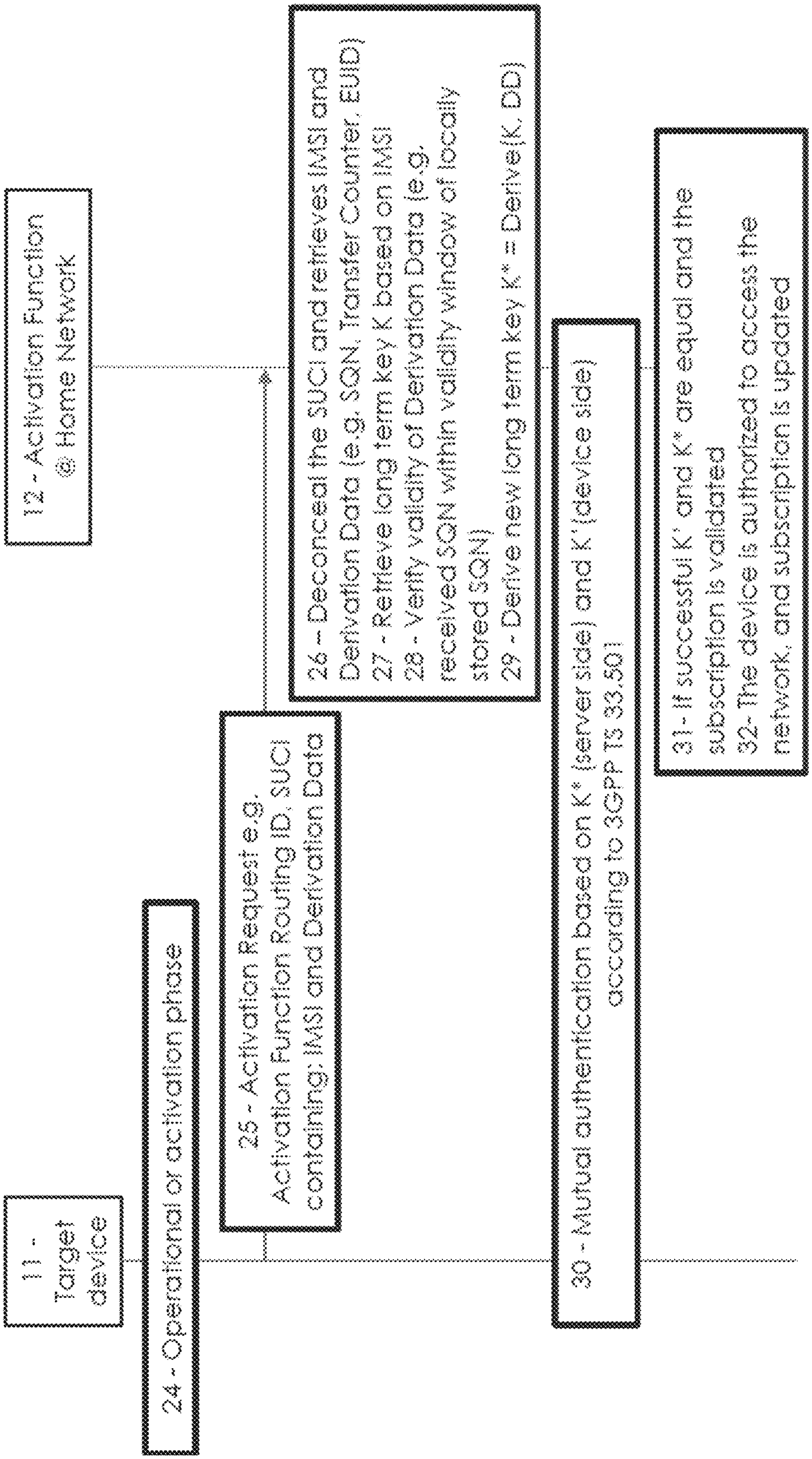

The present invention will be better understood by reading the following description of the figures that represent:

FIG. 1 the transfer of a USIM profile from a source device to a target device;

FIG. 2 the validation by the home network of the transfer of the USIM profile from a source device (contained in the secure element cooperating with this source device, this profile containing a subscription profile of this secure element to a home MNO) to a target device.

FIG. 1 represents the transfer of a USIM profile from a source device to a target device.

In this figure, the source device is referenced 10 and the target device is referenced 11.

In a first step 13, the source device 10 performs a trust verification of the target device 11, for example by verifying that the certificate of the target device 11 is valid in order to ensure that the target device 11 is allowed to receive a USIM profile from the source device 10.

If the target device 11 is entitled (meaning target device 11 has a valid certificate, was successfully authenticated bade based on said certificate and is eligible to receive a profile from source device) to get a USIM profile from the source device 10, the source device 10 generates a derivation data.

This derivation data can be for example:

a transfer counter decremented by one, a random number, a cryptographic token provisioned in the source device by the home network, the current authentication sequence number (there is no generation as such at the level of the source device 10, but only an extraction of the sequence number, also called SQN), the identity of the source device, e.g. its eUICCID (embedded UICC Identity) or IMEI (International Mobile Equipment Identity). These identities are in fact those of the identity of the execution platform of the source device 10, the identity of the target device, e.g. its eUICCID (embeded UICC Identifier) or IMEI, a token that has been configured in the source device by the home MNO.

The use of a transfer counter permits to limit the number of times that the source 10 device is allowed to try to transfer a new USIM profile to a target device 11. For instance, when this counter is equal to zero, the source device 10 is no more allowed to try to transfer a USIM profile. Or, the transfer counter could represent the number of transfers, in such case, a maximum number of this counter has been configured by the home MNO in the source profile.

At step 15, the source device 10 derives a new long-term-key K' from the source long term-key K of the source device and the derivation data, which validity is verifiable by a remote server at the home MNO, K'=Derive (K, DD), where DD is the derivation data. The derivation algorithm can for example consist in computing a hash of the long term-key K concatenated with the derivation data.

At step 16, the source device 10 generates a new USIM profile including the derived long-term-key K' and the derivation data DD.

At step 17, the source device 10 protects in confidentiality and integrity the new profile based on the target device's 11 public key in order to obtain an installation package. The public key of target device 11 is contained in the target device 11 certificate and was verified by the source device 10 at step 13.

At step 18, the source device 10 transfers the installation package to the target device 11 for instance via a local communication channel e.g. 3 GPP PC5 (device-to-device communication), Bluetooth, direct WIFI access or NFC.

The installation package may include:

the derivation data and either any or all of the following:

the hash of the originally received USIM profile by the source device 10, or the certificate or certificate fingerprint of the originally received USIM profile by the source device 10.

Preferably, the target device 11, upon reception of the installation package from the source device 10:

Verifies that the installation package is valid and comes from a valid source device;

Installs the installation package;

Stores locally the derivation data.

At step 20, the target device 11 verifies the validity of the installation package by verifying that the installation package has been signed by the source device 10. To be noted that the source device 10 was authenticated by the target device 11 during step 14 based on the source device 10 certificate. If the source device 10 is authorized by the user (i.e. user consent) to install the package and if the installation package is valid, the target device 11 installs at step 21 the package (in its secure element) and informs (at step 22) the source device 10 that the installation was successful.

The source device 10 can then deactivate (step 23) its own profile (i.e. source profile), since the installation of the installation package at the target device 11 is successful.

The source device 10 has then its original USIM profile locally deactivated and the target device has a new USIM profile with a long-term key K' installed. But the subscription comprised in this new USIM profile is not at this step active from the network point of view, i.e. the target device 11 long term key K' is not for the moment known by the home network.

FIG. 2 represents the validation by the home network of the transfer of the new USIM profile from the source device 10 (contained in the secure element cooperating with this source device, this profile containing a subscription profile of this secure element to a home MNO) to the target device 11.

Here the home network of the source device 10 contains an activation function 12 (e.g. a dedicated server exposing similar interface as a UDM or a UDM). The activation function is located in a dedicated server (hereinafter called remote server) connected or integrated to the home MNO network (HPLMN).

At step 24, we are in the activation phase of the new USIM application in the target device 11 or the installation of the installation package has been successfully executed. Activation phase meaning that the target device 11 has to make its subscription known and authorized by the home MNO activation function, through the following steps.

The target device 11 sends at step 25 an activation request i.e. a registration request as described in 3GPP TS 33.501 and in 3GPP TS 23.501, however, with specific information necessary to the activation process to the activation function 12. The registration request is sent either over 3GPP access (e.g. NG-RAN, 5G Satellite access) or non-3GPP access (e.g. WLAN).

The 3GPP TS 23.501 specification is for example Release 15 dated Dec. 22 2017.

This activation or registration request comprises at least the IMSI of the target device 11 (which is the same as the IMSI of the source device 10) and the derivation data.

The activation request may for instance be a SUCI comprising the IMSI and the derivation data with a specific Routing Identifier that enables the 5G system to route the activation request to the activation function or a UDM capable of handling this activation request for registration purpose.

At step 26, the activation function 12 retrieves the IMSI and the derivation data (for example the SQN, transfer counter or the eUID) from the received activation request, for example by de-concealing the received SUCI.

Once the IMSI is retrieved, the activation function 12 is able to associate this IMSI to the long-term key K of the source device 10 (step 27).

At step 28, the activation function 12 verifies the validity of the derivation data, for example when a SQN is used, that this SQN is in a given window known by the activation function 12 (the activation function knows the last used SQN). If the derivation data is a transfer counter, the activation function 12 (distant server) can check that the transfer counter is valid relative to the locally stored transfer counter in the home network.

It is also possible to verify:

if the derivation data is a cryptographic token, that the cryptographic token has been derived from or is a cryptographic token associated to the IMSI, if the derivation data is the source device identity, that the source identity is equal to the source device identity associated to the IMSI.

At step 29, the activation function 12 derives a new long term-key K*, where K*=Derive (K, DD). Normally, K* equals K' if everything was correctly executed during the preceding steps.

At step 30, a mutual authentication is performed (according to 3GPP TS 33.501) between the target device 11 and the activation function 12 by using:

K* by the activation function 12;

K' by the target device 11.

At step 31, the mutual authentication has been executed with success. This means that K' and K* are equal and the subscription is then validated.

At step 32, the target device 11 is authorized to access to the home network and the subscription is updated (the home network updates its local subscriber information including the long-term-key associated to said IMSI with the new value of K*).

For example, if a SM-DP+ is used, the activation function 12 can update the binding information in the HPLMN SM-DP+ between the USIM profile and the secure element (eUICC), by providing the SM-DP+ with at least the IMSI, the key K*, source EUID and destination EUID.

If the mutual authentication has not been executed with success, K' and K* are different and it means that something went wrong and the process stops at step 31.

The subscription that was present in the source terminal 10 has thus been transferred to the target terminal 11 and the source terminal is no more able to access to the home MNO network. The source device profile is now deactivated by the activation function at the network side.

The invention also concerns a system for allowing traceability of USIM profile transfer from a source device to a target device, the system comprising a remote server, the source device being configured for:

Performing a mutual trust verification of the target device by the source device;

Generating a derivation data being verifiable by the remote server connected to the home network of the source device;

Deriving a new long-term-key K' from the source long term-key K of the source device and the derivation data;

Generating a new USIM profile including the derived long-term-key K' and the derivation data;

Protecting in confidentiality and integrity the new profile based on the target device's public key in order to obtain an installation package;

Transferring the installation package to the target device,

Deactivating the source USIM profile if the installation of the installation package at the target device is successful, the target device being configured for:

Sending to the remote server in a registration request as specified in 3GPP TS 23.501 at least its IMSI and the derivation data, the remote server being configured for:

Retrieving the source long term-key K of the source device and the derivation data associated to the IMSI;

Verifying the validity of the received derivation data based on subscription information associated to the IMSI;

Deriving a new long term-key K* from the source long-term key K and the received derivation data;

Performing the authentication of the target device based on K* and retrieved subscription data associated to the IMSI as specified in 3GPP TS 33.501;

If K* equals K', updating at the home network its local subscriber information associated to the IMSI including the long-term-key associated to the IMSI with the new value of K*.

The invention also concerns a remote server allowing traceability of a USIM profile transfer from a source device to a target device, the remote server being connected to the home network of the source device and configured for:

Receiving from the target device in a registration request as specified in 3GPP TS 23.501 at least its IMSI, a derivation data and a new long-term-key K' generated by the source device from the long-term-key K of the source device by the derivation data;

Retrieving the source long term-key K of the source device and the derivation data associated to the IMSI;

Verifying the validity of the received derivation data based on subscription information associated to the IMSI;

Deriving a new long term-key K* from the source long-term key K and the received derivation data;

Performing the authentication of the target device based on K* and retrieved subscription data associated to the IMSI as specified in 3GPP TS 33.501;

If K* equals K', updating at the home network its local subscriber information associated to the IMSI including the long-term-key associated to the IMSI with the new value of K*.

The advantages brought by the invention, based on the derivation of the long-term key K of the Network Access Application based on verifiable data by the Home network activation function, are:

Allowing the activation server 12 to trace the transfer of a subscription to the target device 11 from a source device 10;

There is no transfer (or export) of the source device 10 long term key K and K is not known by the target device 11;

It prevents cloning or duplication of the profile (i.e. the same couple IMSI/long-term key K) while allowing offline transfer of the profile.

The invention claimed is:

1. A method to allow traceability of Universal Subscriber Identity Module (USIM) profile transfer from a source device to a target device, said method comprising:

performing a mutual trust verification of said target device by said source device and vice versa;

generating a derivation data at said source device, said derivation data being verifiable by a remote server connected to home network of said source device;

deriving at said source device a new long-term-key K' from the source long term-key K of said source device and said derivation data;

generating at said source device a new USIM profile including the derived long-term-key K' and said derivation data;

protecting in confidentiality and integrity of the new profile based on the target device's public key in order to obtain an installation package;

transferring said installation package to said target device;

deactivating the source USIM profile at said source device when the installation of said installation package at said target device is successful;

sending from said target device to said remote server in a registration request as specified in Security Architecture and Procedure for 5G System Specification 23.501 (3GPP TS 23.501) at least its International Mobile Subscriber Identity (IMSI) and said derivation data;

retrieving at said remote server said source long term-key K of said source device and the derivation data associated to said IMSI;

verifying the validity of said received derivation data based on subscription information associated to said IMSI by said remote server;

deriving a new long term-key K* from said source long-term key K and the received derivation data;

performing the authentication of said target device based on K* and retrieved subscription data associated to said IMSI as specified in Security Architecture and Procedure for 5G System Specification 33.501 (3GPP TS 33.501); and when K* equals K', updating at said home network its local subscriber information associated to said IMSI including a long-term-key associated to said IMSI with the new value of K*.

2. The method according to claim 1 wherein said trust verification of said target device by said source device consists in verifying at said source device when the certificate of said target device is valid.

3. The method according to claim 2 wherein said derivation data is one or more of:

a transfer counter decremented by one, a random number, a cryptographic token provisioned in said source device by said home network, the current authentication sequence number, the identity of said source device comprising its Embedded Universal Integrated Circuit Card ID (Euiccid) or IMEI, the identity of said target device comprising its Embedded Universal Integrated Circuit Card ID (Euiccid) or IMEI.

4. The method according to any of the claim 3 wherein the step of deriving at said source device a new long-term-key K' from the source long term-key K consists in computing a hash of said long term-key K with said derivation data.

5. The method according to claim 4 wherein said installation package includes:

said derivation data and one or more of:

the hash of the originally received USIM profile by said source device, or the certificate or fingerprint of the certificate of the originally received USIM profile by said source device.

6. The method according to claim 5 wherein said target device, upon reception of said installation package from said source device:

verifies that said installation package is valid and comes from a valid source device (10);

installs said installation package; and stores locally said derivation data.

7. The method according to claim 6 wherein the step of sending from said target device to the home network of said source device at least its IMSI and said derivation data consists in using a specific Routing ID of said remote server capable of handling such transferred USIM profile, in a registration request as specified in 3GPP TS 23.501.

8. The method according to claim 7 wherein said remote server verifies:

when said derivation data is the sequence number of said source device, that the received sequence number is valid relative to the locally stored sequence number by said home network;

when said derivation data is a transfer counter, that said transfer counter is valid relative to the locally stored transfer counter by said home network, when said derivation data is a cryptographic token, that said cryptographic token has been derived from or is a cryptographic token associated to said IMSI, and when said derivation data is the source device identity, that said source identity is equal to the source device identity associated to said IMSI.

9. The method according to claim 8 wherein said remote server updates the binding information in the Home Public Land Mobile Network Subscription Manager Data Preparation Plus (HPLMN SM-DP+) between the USIM profile and the secure element of said target device, by providing said SM-DP+ with at least said IMSI, said new long term-key K*, source EUID and destination EUID.

10. A system for allowing traceability of Universal Subscriber Identity Module (USIM) profile transfer from a source device to a target device, said system comprising a remote server, said source device being configured for:

performing a mutual trust verification of said target device by said source device;

generating a derivation data being verifiable by said remote server connected to the home network of said source device;

deriving a new long-term-key K' from the source long term-key K of said source device and said derivation data;

generating a new USIM profile including the derived long-term-key K' and said derivation data;

protecting in confidentiality and integrity of the new profile based on the target device's public key in order to obtain an installation package;

transferring said installation package to said target device, and deactivating the source USIM profile when the installation of said installation package at said target device is successful, said target device being configured for:

sending to said remote server in a registration request as specified in Security Architecture and Procedure for 5G System Specification 23.501 (3GPP TS 23.501) at least its International Mobile Subscriber Identity (IMSI) and said derivation data, said remote server being configured for:

retrieving said source long term-key K of said source device and the derivation data associated to said IMSI;

verifying the validity of said received derivation data based on subscription information associated to said IMSI;

deriving a new long term-key K* from said source long-term key K and the received derivation data;

performing the authentication of said target device based on K* and retrieved subscription data associated to said IMSI as specified in Security Architecture and Procedure for 5G System Specification 33.501 (3GPP TS 33.501); and when K* equals K', updating at said home network its local subscriber information associated to said IMSI including a long-term-key associated to said IMSI with the new value of K*.

* * * * *